March 25, 1924.

A. RYDEN

OUTLET BOX

Filed May 14, 1921

1,487,892

Witnesses:
John E. Titus
O. Tsutsumi

Inventor
Axel Ryden
By Miller Chindohl Parker
Attys

Patented Mar. 25, 1924.

1,487,892

UNITED STATES PATENT OFFICE.

AXEL RYDEN, OF CHICAGO, ILLINOIS, ASSIGNOR TO APPLETON ELECTRIC COMPANY, OF CHICAGO, ILLINOIS, A CORPORATION OF ILLINOIS.

OUTLET BOX.

Application filed May 14, 1921. Serial No. 469,742.

*To all whom it may concern:*

Be it known that I, AXEL RYDEN, a citizen of the United States, residing at Chicago, in the county of Cook and State of Illinois, have invented certain new and useful Improvements in Outlet Boxes, of which the following is a specification.

The invention relates to outlet boxes used in electric wiring installations, and more particularly to such boxes as are constructed to support suspended lamp fixtures or branch conduits. In electric wiring construction conditions frequently necessitate the location of outlet boxes in such position that flexible connections between the box and the fixture or conduit leading therefrom are highly desirable. The suspension of lamp fixtures from a sawtooth roof or from rough or inclined ceiling constructions are instances in which it may be necessary to position the outlet branch in variable angular relation to the box. It is frequently desirable also to provide a lamp fixture with a universally movable connection with its base in order that the lamp may be swung into variable positions for its most convenient use.

An object of this invention is to provide an improved form of fixture connection for supporting lighting or other fixtures or the like from outlet boxes or other supports.

Another object is to provide a flexible connection which is secured within an outlet box and which is adapted to receive wires leading from the box to the branch conduit, the box cover being freely removable without disturbing the connection.

Another object is to provide an improved outlet box connection by which a branch conduit may be swung in any direction without being rotated relatively to the box.

A further object is to provide a box and connection which are very durable in use and are simple and inexpensive to manufacture.

Other objects and advantages will be apparent in the following detailed description of a preferred embodiment of my invention which I have illustrated in the accompanying drawings.

Figure 1:
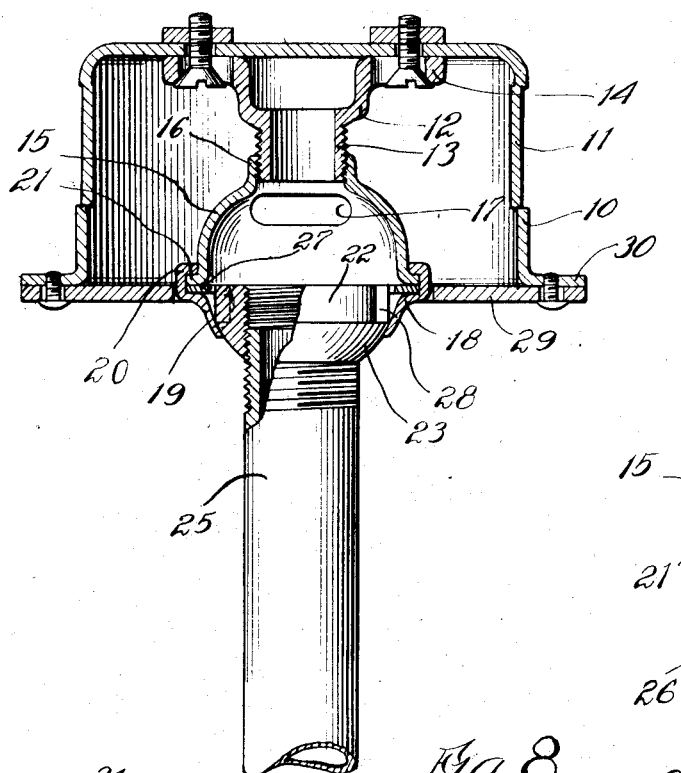
Figure 2:
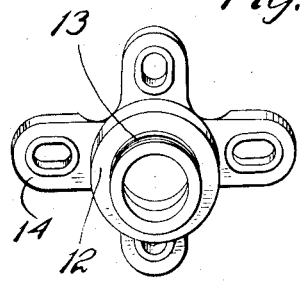
Figure 3:
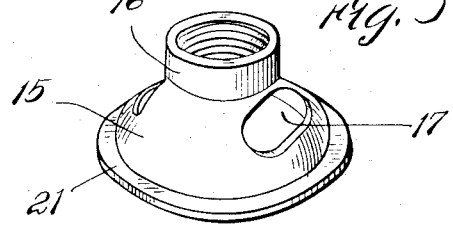
Figure 4:
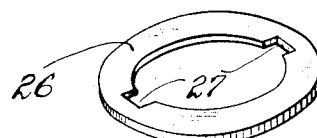
Figure 5:
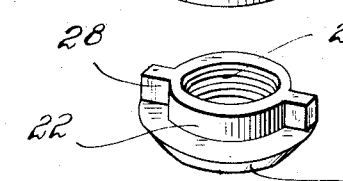
Figure 6:
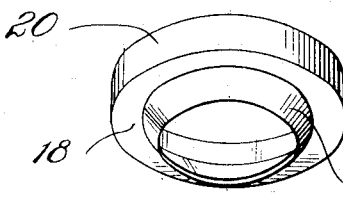
Figure 7:
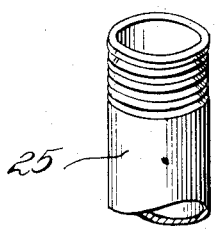
Figures 8, 9:
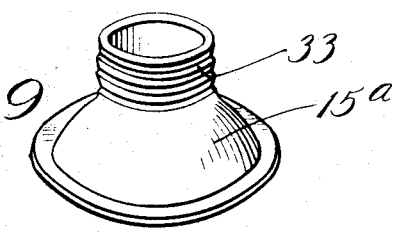

Figure 1 of the drawings is a vertical sectional view through an outlet box and my preferred form of connection with a portion of a fixture conduit suspended therefrom. Fig. 2 represents a bracket by which the connection is secured to the base of the box. Figs. 3 to 6, inclusive, illustrate in detail the several parts of the universal joint. Fig. 7 represents the engaging end of the fixture or branch conduit. Figs. 8 and 9 illustrate a modified adaption of my construction to an ordinary type of side opening conduit connection.

Referring to Fig. 1, I have illustrated an outlet box having a casing 10 constructed in the usual form and adapted alike for oper work construction or for being positioned in a wall with its front face flush with the surface of the wall. The casing 10 is provided with partially punched knockout openings 11 in the side and rear walls of the casing adapted to receive wire containing conduits leading into the outlet box. It will be understood that any particular form of casing for an outlet box may be used in connection with my invention without departing from the spirit and scope of the invention.

For the support of a fixture or branch conduit leading from the box, a bracket 12 having a tubular body screw-threaded at its outer end 13 and having radially disposed spaced feet 14 at its opposite end, is secured to the inner wall of the outlet box as by means of bolts.

In the preferred form of my flexible connection, as illustrated in Figs. 3 to 6 inclusive, I have provided a bell-shaped shell 15 having a tubular extension 16 adapted to be threaded upon the end portion 13 of the bracket. The shell is provided with lateral openings 17 located directly adjacent the knockout openings 11 in the outlet box through which conductor wires may enter from the outlet box and be led through the flexible connection to the fixture suspended therefrom.

The shell 15 supports an annular socket member 18 which comprises a plate formed with a spherical portion 19 extending below the shell and a cylindrical flange portion 20 adapted to engage the lower end of the shell, the shell and socket member being secured together in rigid relation. In the present instance I have provided a very secure and simple joint between these two members by spinning the upper end of the cylindrical flange 20 carried by the socket member over and upon a radial flange 21 formed integrally with the shell.

Supported within the socket member is a ball element or head 22 having a spherical or rounded under surface 23 which engages the spherical lower portion of the socket member and is supported thereby in free swinging relation. The ball element 22 is provided with an open passage 24 through its center which is internally screw-threaded to receive the threaded end of a tubular conduit or fixture 25 suspended from and supported by the ball element. The conductor wires entering the flexible connections through the openings 17 in the shell are conducted down through the opening 24 in the ball element, and into the fixture or conduit 25.

To prevent rotation of the ball element 22 within the socket member 18, I have provided a flat ring 26 interposed between the shell 15 and the socket member 18, and secured rigidly in position between the abutting portions of those two members. The ring 26 is formed with a pair of diametrically opposed notches 27 in the periphery of the opening through the ring. The ball element is also provided with diametrically opposed lugs 28 which are adapted to extend within the notches formed in the ring so that in all positions of the ball element within the supporting socket member one or both of the lugs will be in engagement with the notches formed in the rigidly positioned ring, and thus effectually prevent rotative movement of the ball element within the socket. The ring 26 also overlies the element 22 in between the lugs 28 in an obvious manner and thereby serves to retain the element in place in its socket.

In my preferred construction, as herein described, it will be seen that all of the parts forming the flexible connection are positioned substantially within the outlet box. This feature adds materially to the convenience and sightliness of the outlet connections particularly when the outlet box is set into a wall with its front face flush with the surface of the wall. To effect a closure of the outlet box about the connection, a flat plate 29 is suitably secured to the side wall flanges 30 of the box, as by means of screws. The plate is provided with a center opening suitable to allow the free entry of the flexible connection.

In Figs. 8 and 9 I have illustrated an adaptation of my connection suitable for use with a commonly used fitting 31 employed in connection with electric wiring conduits and which fitting is provided with a lateral annular extension 32 adapted to receive and support a fixture, and opening into the interior of the fitting to permit the exit of conductor wires leading from the conduit fitting to the fixture. To accommodate the use of my flexible connection with such fittings, I may construct the shell member 15ª as illustrated in Fig. 9 having a nipple portion 33 externally screw-threaded to engage the extension 32, omitting from the shell 15 the lateral openings for the entry of the conductor wires.

It will now be apparent that the outlet box connection which I have provided is of very simple arrangement employing a minimum number of parts and capable of being manufactured at very low cost. It is also of exceedingly durable construction adapted to withstand hard usage, and providing a wide range of swinging movement for the suspended fixture with effective means for preventing rotation of the fixture and consequent twisting of the conductor wires.

I claim as my invention:

1. In combination with an outlet box having a fixture supporting bracket, a fixture connection comprising a shell rigid with said support and having lateral openings therethrough, a socket member fixed to said shell, an annulus rigidly positioned in said shell having a plurality of notches formed on its inner periphery, an axially apertured ball element supported in said socket, and a plurality of lugs on the ball element adapted to engage said notches, said ball element being adapted to receive a tubular fixture in rigid relation therewith.

2. A fixture connection for an outlet box having an inner support therefor, comprising a shell fixed to said support, an annular socket rigid with said shell, a flat ring rigidly secured between said shell and said annular socket, said ring having a notch formed in its inner periphery, a ball element adapted to be rigidly connected to a tubular fixture and positioned within said annular socket for universal swinging movement, and a lug formed on said ball element adapted to be engaged in said notch to prevent rotative movement of said ball element in said annular socket.

3. A fixture connection for an outlet box comprising an annular shell having one end rigid with said box, a radial flange formed on the other end of said shell, a socket member having a shoulder shaped to abut said radial flange, a tubular extension formed on said shoulder arranged to receive said flange, a flat annulus having notches in its inner periphery and interposed between said shoulder and said shell, said tubular extension being spun over and upon said radial flange to secure said shell, said annulus and said socket member in rigid attachment, a ball element mounted in the socket member and universally swingable therein, said ball element being adapted to receive a fixture, and lugs formed upon the ball element and engaging said notches to prevent rotative movement between said ball element and said socket member.

4. The combination of a plate provided with a socket, a head for supporting a fixture having a rounded under portion fitting in said socket to have universal movement therein in the universal swinging movement of the fixture with respect to the socket, a second plate extending over said socket on the inside of said first plate and held against turning relative thereto, said plate having an aperture through which the upper portion of said head is arranged to project, said upper portion being cut away at places thereon forming shoulders thereby with the said lower portion, and said plate having portions overlying said cut-away places to limit by engagement with said shoulders the upward displacement of said head from said socket while preventing said head from turning in said socket by the engagement of said overlying portions in said cut-away places.

5. The combination of a plate having a socket therein, a head for supporting a fixture having a rounded outer portion fitting in said socket for universal movement therein, a second plate extending over said socket and held against turning with respect thereto, said plate having an aperture to admit the inner portion of said head, said inner portion being of reduced size whereby said plate serves by engagement of said enlarged outer portion of said head with the plate at said aperture to retain said head in place in said socket, and interfitting portions on said plate and head serving to prevent rotation of said head in said socket.

6. The combination of a socket carried by a support, a head for supporting a fixture having a rounded lower portion setting in said socket for universal movement therein, said head having a vertical sided upper portion formed with projections thereon diametrically oppositely disposed, there being left recesses between said projections forming shoulders on said lower portion, a wall extending across the socket having an aperture to receive said upper portion, said wall having portions thereon to overlie said shoulders and engage in said recesses between the projections on said head to prevent said head from turning in said socket while permitting true universal movement therein, said overlying portions being adapted by engagement with said shoulders to prevent upward displacement of said head through said aperture out of said socket.

7. The combination with an outlet box having openings in the side walls thereof closed by knockout slugs, of a shell centrally arranged within said box having one end supported from the bottom of said box, a flat cover plate for said box, a socket piece carried by said shell, said cover plate being disposed in the plane of the top of said socket piece and having a central opening to receive said socket piece, a head for supporting a fixture universally movable in said socket, said head being provided with an opening therethrough to permit the extension of wires from said fixture, and having means positively to prevent its turning in said socket in the universal movement thereof whereby to prevent twisting of the wires and also to permit detaching and affixing fixtures to said head, and said shell being provided with an opening directly adjacent said knockout openings to permit the extension of said fixture wires from said fixture for connection with wires in conduits entered in the knockout openings.

In testimony whereof, I have hereunto set my hand.

AXEL RYDEN.